United States Patent
Martinez Tarradell et al.

(10) Patent No.: US 10,779,224 B2
(45) Date of Patent: Sep. 15, 2020

(54) SYSTEM INFORMATION CHANGE NOTIFICATION TECHNIQUES FOR WIRELESS COMMUNICATIONS NETWORKS

(71) Applicant: INTEL IP CORPORATION, Santa Clara, CA (US)

(72) Inventors: Marta Martinez Tarradell, Hillsboro, OR (US); Debdeep Chatterjee, San Jose, CA (US); Hyung-Nam Choi, Hamburg (DE); Richard C. Burbidge, Oxfordshire (GB); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/751,843

(22) PCT Filed: Sep. 26, 2016

(86) PCT No.: PCT/US2016/053846
§ 371 (c)(1),
(2) Date: Feb. 9, 2018

(87) PCT Pub. No.: WO2017/054007
PCT Pub. Date: Mar. 30, 2017

(65) Prior Publication Data
US 2018/0270738 A1 Sep. 20, 2018

Related U.S. Application Data

(60) Provisional application No. 62/232,392, filed on Sep. 24, 2015.

(51) Int. Cl.
*H04W 56/00* (2009.01)
*H04W 48/16* (2009.01)
(Continued)

(52) U.S. Cl.
CPC ............ *H04W 48/16* (2013.01); *H04W 4/70* (2018.02); *H04W 48/12* (2013.01); *H04W 68/00* (2013.01); *H04W 84/042* (2013.01)

(58) Field of Classification Search
CPC ....... H04W 48/16; H04W 4/70; H04W 48/12; H04W 68/00; H04W 84/042
(Continued)

(56) References Cited

U.S. PATENT DOCUMENTS 9,743,352 B2    8/2017  Hoglund et al.
2016/0105264 A1*  4/2016  Chen ..................... H04W 4/70
                                                370/329
(Continued)

OTHER PUBLICATIONS

International Search Report and Written Opinion received for PCT Patent Application No. PCT/US2016/053846, dated Dec. 12, 2016, 18 pages.
(Continued)

*Primary Examiner* — Sai Ming Chan
(74) *Attorney, Agent, or Firm* — Eschweiler & Potashnik, LLC

(57) ABSTRACT

System information change notification techniques for wireless communication networks are described. In one embodiment, for example, an apparatus may comprise a memory and logic, at least a portion of which is implemented in circuitry coupled to the memory, the logic to determine to perform a system information (SI) update procedure at user equipment (UE), identify, based on an SI change indication, one or more SI messages from which to acquire system information blocks (SIBS) according to the SI update procedure, and acquire at least one SIB from each of the one or more SI messages for storage at the UE. Other embodiments are described and claimed.

34 Claims, 12 Drawing Sheets

(51) Int. Cl.
*H04W 48/12* (2009.01)
*H04W 4/70* (2018.01)
*H04W 68/00* (2009.01)
*H04W 84/04* (2009.01)

(58) Field of Classification Search
USPC .......................................................... 370/328
See application file for complete search history.

(56) References Cited

U.S. PATENT DOCUMENTS

| | | | |
|---|---|---|---|
| 2016/0174135 A1* | 6/2016 | Yan | H04W 76/10 455/434 |
| 2016/0192292 A1* | 6/2016 | Hoglund | H04W 52/0216 370/311 |
| 2017/0105166 A1* | 4/2017 | Lee | H04W 48/12 |
| 2018/0054809 A1* | 2/2018 | Zhu | H04L 5/0053 |

OTHER PUBLICATIONS

"Remaining Issues on Paging for MTC UE", 3GPP TSG-RAN WG2 #90, R2-153737, Aug. 24-28, 2015, 4 pages (author unknown).
"SI update for Rel-13, low complexity and coverage enhanced UEs", 3GPP TSG-RAN WG2 #91, R2-153719, Aug. 24-28, 2015, 5 pages (author unknown).
"Email discussion report on [90#23][LTE/MTC-LC] SIB Contents", 3GPP TSG RAN WG2 Meeting #91, R2-153277, Aug. 24-28, 2015, 33 pages (author unknown).
"Open aspects on system information messages for Release-13 low complexity UEs and enhanced coverage", 3GPP TSG RAN WG2 Meeting #91, R2-153276, Aug. 24-28, 2015, 4 pages (author unknown).
"New Work Item: NarrowBand IOT (NB-IOT)", 3GPP TSG RAN Meeting #69, RP-1516213, Sep. 14-16, 2015, 9 pages (author unknown).
"Revised WI: Further LTE Physical Layer Enhancements for MTC", 3GPP TSG RAN Meeting #67, RP-150492, Mar. 9-12, 2015, 9 pages (author unknown).

* cited by examiner

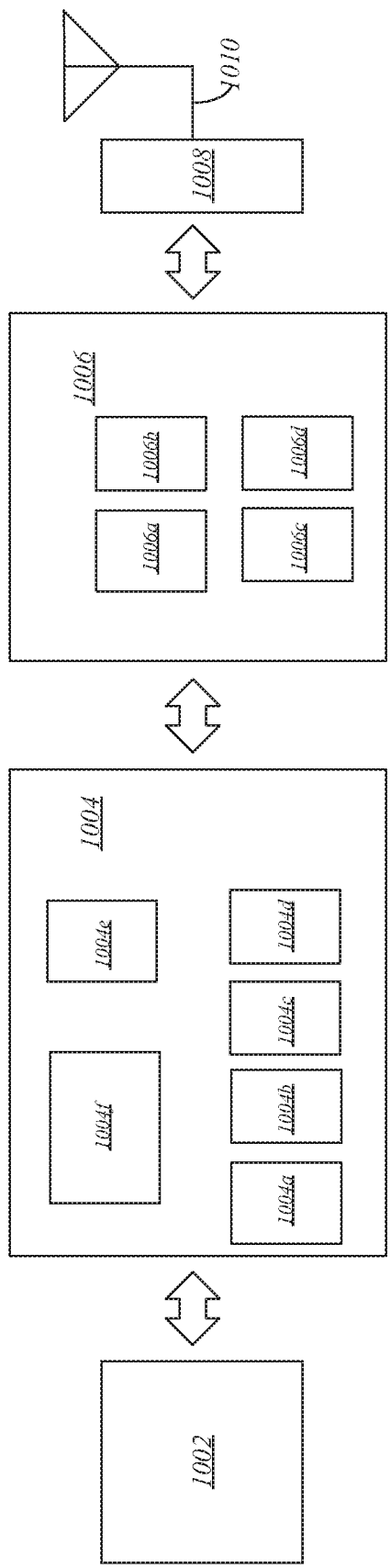

SYSTEM INFORMATION CHANGE NOTIFICATION TECHNIQUES FOR WIRELESS COMMUNICATIONS NETWORKS

RELATED CASE

This application is a national stage application claiming the benefit of and priority to International Application No. PCT/US2016/053846 entitled "SYSTEM INFORMATION CHANGE NOTIFICATION TECHNIQUES FOR WIRELESS COMMUNICATIONS NETWORKS" filed Sep. 26, 2015, which claims priority to U.S. Provisional Patent Application No. 62/232,392, filed Sep. 24, 2015, both of which are incorporated herein by reference in their entirety.

TECHNICAL FIELD

Embodiments herein generally relate to communications between devices in broadband wireless communications networks.

BRIEF DESCRIPTION OF THE DRAWINGS

FIG. 10 illustrates an embodiment of a user equipment device.

DETAILED DESCRIPTION

Figure 1:
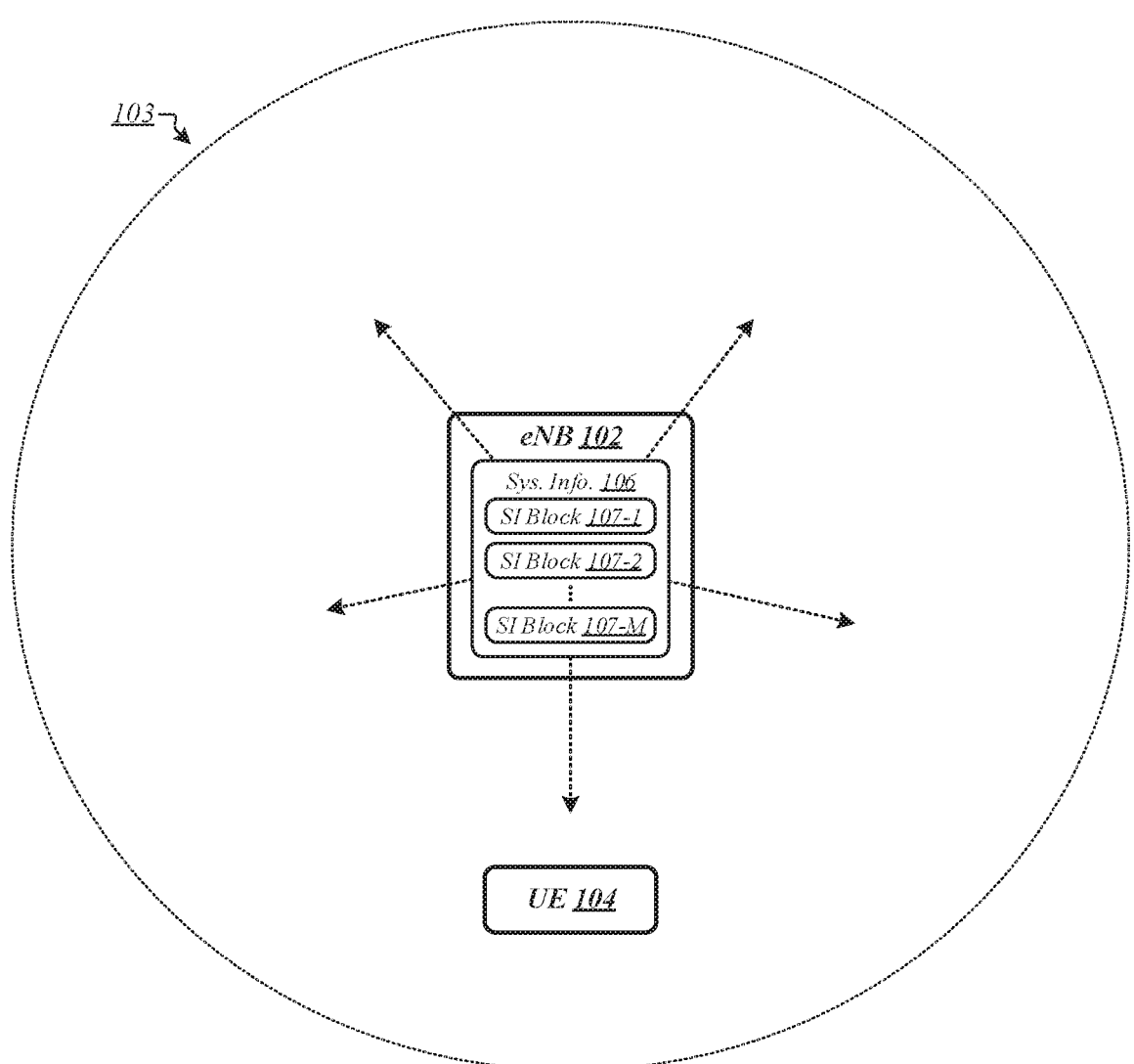
FIG. 1 illustrates an embodiment of a first operating environment.

Various embodiments may be generally directed to system information change notification techniques for wireless communication networks. In one embodiment, for example, an apparatus may comprise a memory and logic, at least a portion of which is implemented in circuitry coupled to the memory, the logic to determine to perform a system information (SI) update procedure at user equipment (UE), identify, based on an SI change indication, one or more SI messages from which to acquire system information blocks (SIBs) according to the SI update procedure, and acquire at least one SIB from each of the one or more SI messages for storage at the UE. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 that may be representative of various embodiments. In operating environment 100, an evolved node B (eNB) 102 may generally serve a cell 103. Via eNB 102, wireless connectivity may be available to other devices located within cell 103, such as user equipment (UE) 104. In some embodiments, UE 104 may operate as a cellular Internet of Things (CIoT) or machine-type communications (MTC) device. In various embodiments, UE 104 may comprise a low-complexity (LC) UE, a category M (Cat-M) UE, or a category 0 (Cat-0) UE. In some embodiments, UE 104 may operate using a reduced bandwidth, such as a 180 kHz bandwidth or a 1.4 MHz bandwidth. In various embodiments, UE 104 may operate in an enhanced coverage (EC) mode. In some embodiments, cell 103 may comprise a narrowband Internet of Things (NB-IoT) cell.

In various embodiments, eNB 102 may notify devices in cell 103 of the configured values of relevant system parameters by broadcasting system information 106. In some embodiments, eNB 102 may provide system information 106 in the form of a plurality of blocks of system information (SI)—illustrated as "SI blocks" 107-1 to 107-M in FIG. 1—each of which may generally comprise information indicating the values of one or more system parameters. eNB 102 may generally transmit each of the SI blocks 107-1 to 107-M of system information 106 on an ongoing, repetitive basis, in order to enable devices that enter (or are powered on within) cell 103 for the first time to acquire system information that they require in order to operate properly in cell 103. These recurrent transmissions may also enable devices already operating in cell 103 to update their stored system information for cell 103 when system parameters are modified.

It is worthy of note that as employed herein, the term "SI block" is not intended to convey a meaning synonymous with "system information block" (SIB). Rather, "SI block" is employed generically to denote a block of system information. According to the meaning intended, both SIBs and master information blocks (MIBs) constitute SI blocks. Thus, in various embodiments, for example, one of SI blocks 107-1 to 107-M may comprise an MIB, while the remainder of SI blocks 107-1 to 107-M may comprise SIBs. The embodiments are not limited in this context.

Figure 2:
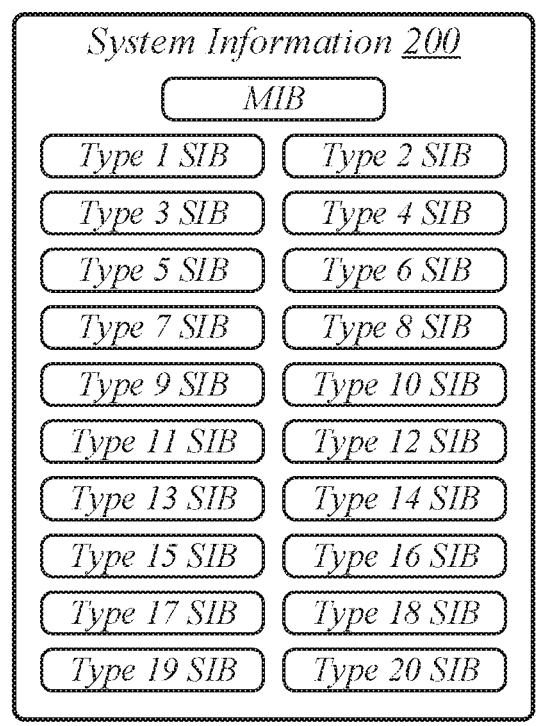
FIG. 2 illustrates an embodiment of first system information.

FIG. 2 illustrates an example of a system information 200 that may be representative of system information 106 of FIG. 1 according to some embodiments. In the arbitrary example of FIG. 2, system information 200 comprises a total of twenty-one SI blocks. As such, system information 200 may be representative of an example in which M is equal to 21 in operating environment 100 of FIG. 1. Included among the SI blocks comprised in system information 200 according to this example are an MIB and twenty different types of SIBs, which include a type 1 SIB (SIB1), a type 2 SIB (SIB2), a type 3 SIB (SIB3), and so forth. It is to be appreciated that embodiments are not limited to this particular example.

Figure 3:
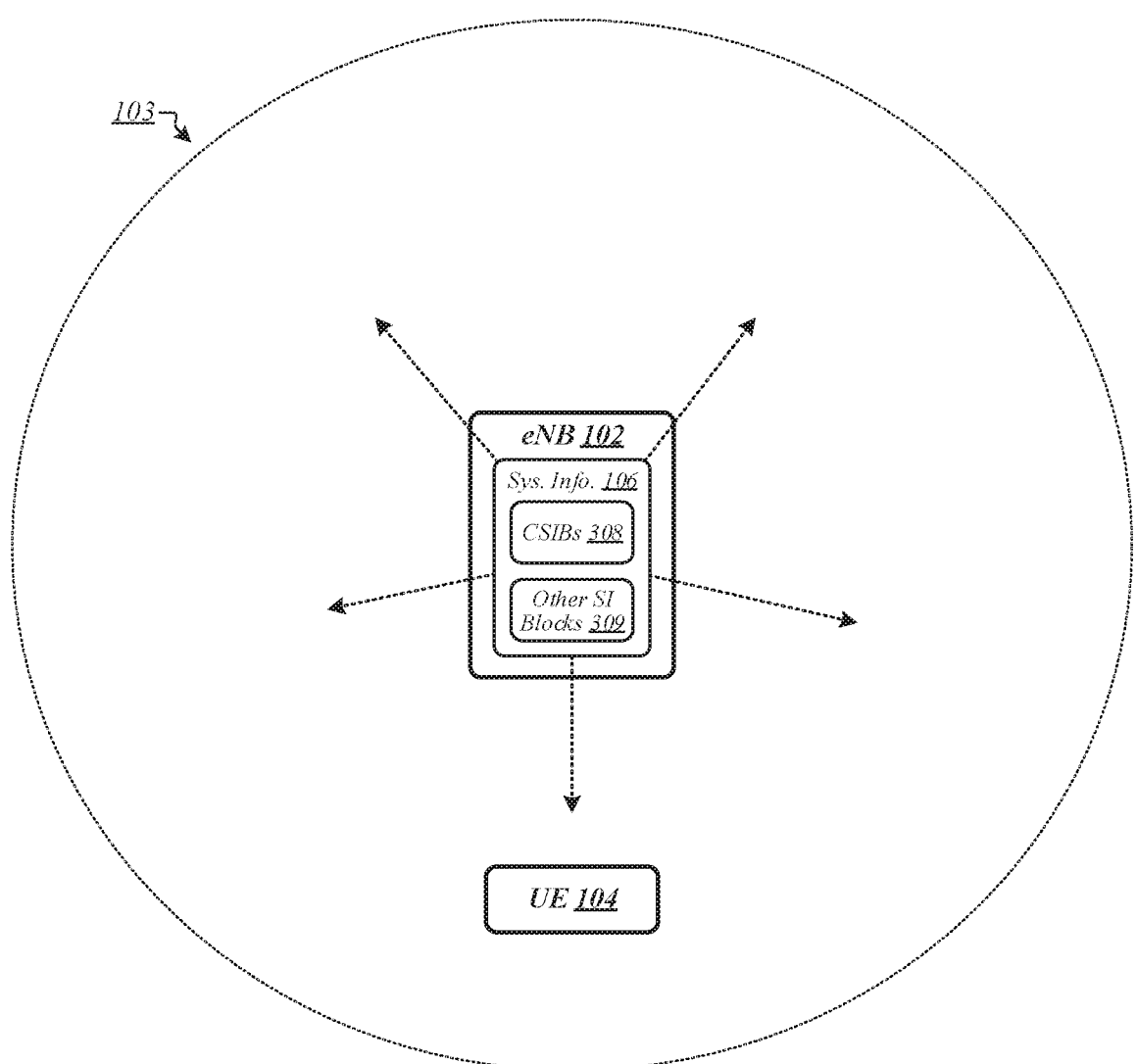
FIG. 3 illustrates an embodiment of a second operating environment.

FIG. 3 illustrates an example of an operating environment 300 that may be representative of various embodiments. In operating environment 300, some of the SI blocks that eNB 102 broadcasts in cell 103 may constitute common SIBs (CSIBs) 308, and the remaining SI blocks may constitute other SI blocks 309. In some embodiments, the permissible timings of modifications to the contents of CSIBs 308 may generally be defined by a modification timing scheme, and other SI blocks 309 may comprise SI blocks to which that modification timing scheme does not apply. In various embodiments, according to that modification timing scheme, the value of a modification period parameter may generally specify a level of time-dimension granularity with respect to the contents of CSIBs 308. In some embodiments, the time dimension may be partitioned into units of modification periods, each of which may comprise a duration defined by the value of the modification period parameter. In various embodiments, the contents of CSIBs 308 may only be permitted to change upon boundaries between such modification periods. In some embodiments, such modification periods may comprise broadcast control channel (BCCH) modification periods of a duration defined by the value of a BCCH modification period parameter. In various other embodiments, the modification timing scheme that applies to CSIBs 308 may define modification periods of a different type. The embodiments are not limited in this context.

Figure 4:
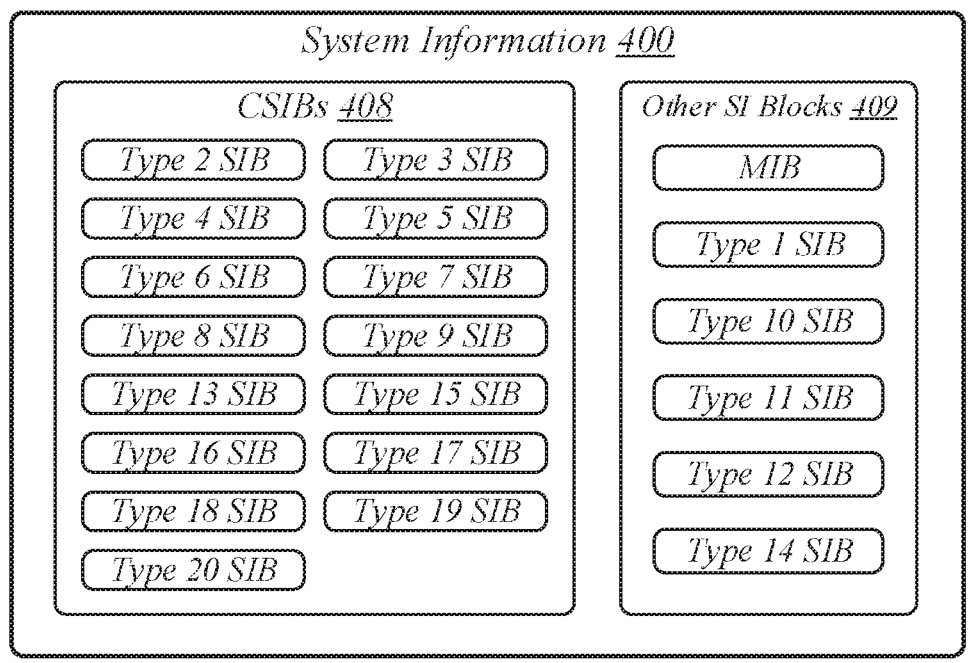
FIG. 4 illustrates an embodiment of second system information.

FIG. 4 illustrates an example of system information 400 that may be representative of system information 106 in operating environment 300 of FIG. 3 according to some embodiments. System information 400 includes the same SI blocks—including an MIB and SIBs of types 1-20—as does system information 200 of FIG. 2. Some of the SI blocks of system information 400 constitute CSIBs 408, while the rest constitute other SI blocks 409. According to various embodiments, CSIBs 408 may be representative of CSIBs 308 of FIG. 3, and other SI blocks 409 may be representative of other SI blocks 309 of FIG. 3. In this example, CSIBs 408 include SIBs of types 2-9, 13, and 15-20, while other SI blocks 409 include SIBs of types 1, 10-12, and 14, as well as the MIB. According to some embodiments, changes to CSIBs 408 may only be permitted to occur upon boundaries between BCCH modification periods. According to various other embodiments, changes to CSIBs 408 may only be permitted to occur upon boundaries between modification periods of some other type. The embodiments are not limited in this context.

Figure 5:
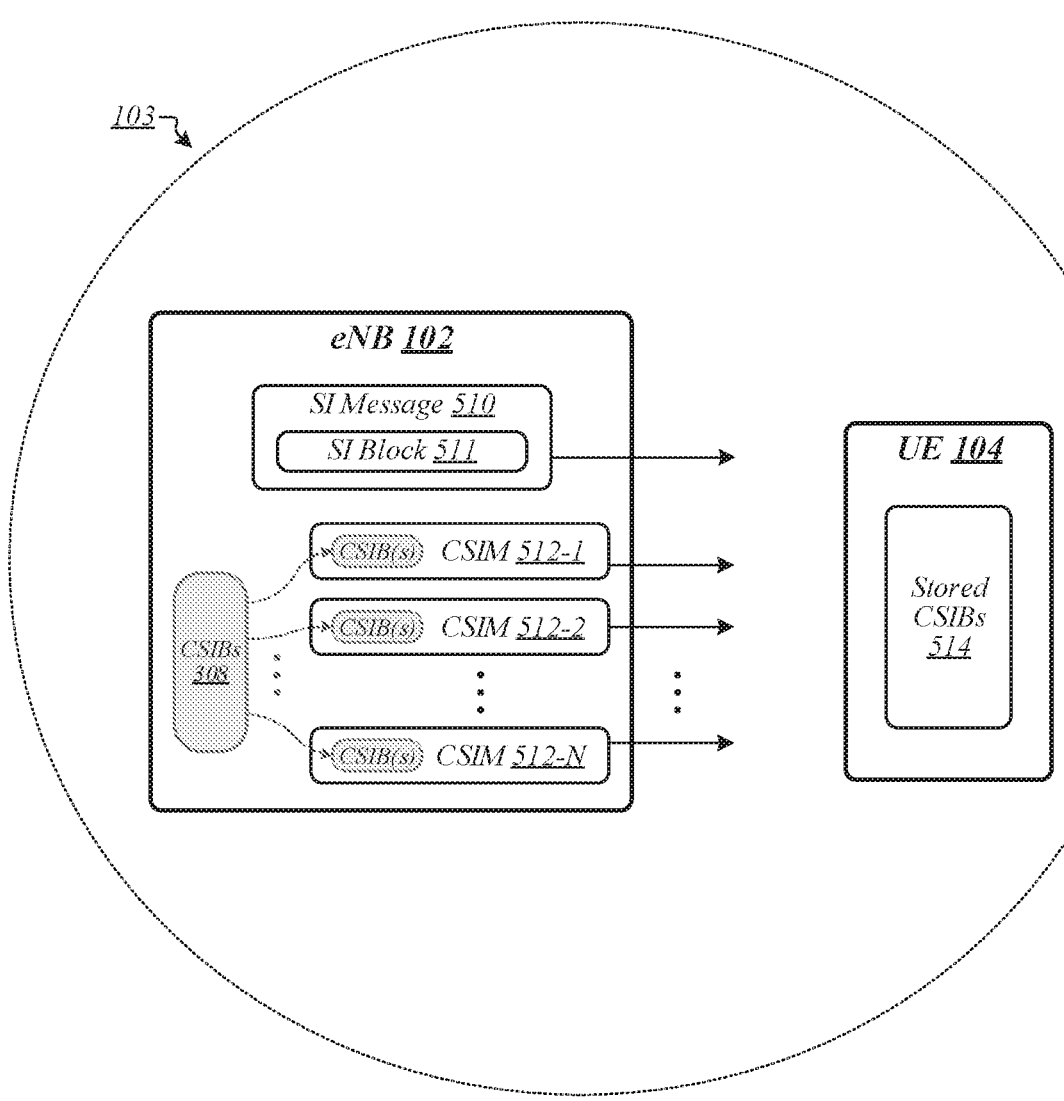
FIG. 5 illustrates an embodiment of a third operating environment.

FIG. 5 illustrates an example of an operating environment 500 that may be representative of some embodiments. In operating environment 500, eNB 102 may provide the collective set of CSIBs 308 to devices in cell 103 by recurrently broadcasting a set of common SIB messages (CSIMs) 512-1 to 512-N. Each such CSIM may contain a different respective subset of the collective set of CSIBs 308 to be provided. It is to be appreciated that CSIMs 512-1 to 512-N may not necessarily comprise CSIBs exclusively, and that any given one of CSIMs 512-1 to 512-N may potentially contain one or more other types of SIBs in addition to one or more of CSIBs 308. In various embodiments, CSIMs 512-1 to 512-N may comprise radio resource control (RRC) messages, such as SystemInformation RRC messages, for example. In some embodiments, the number of CSIBs that can be included within any particular one of CSIMs 512-1 to 512-N may be constrained by a PHY layer-defined limit on the allowable size of such RRC messages, such as a defined maximum number of bits that can be comprised an any particular one of such RRC messages. In various embodiments, for example, the sizes of CSIMs 512-1 to CSIMs 512-N may be limited to a maximum of 1000 bits in order to provide support in cell 103 for low complexity UEs. The embodiments are not limited to this example.

In some embodiments, eNB 102 may recurrently broadcast an SI message 510 comprising an SI block 511 that contains parameters characterizing various aspects of system information transmissions in cell 103. In various embodiments, SI block 511 may comprise a type 1 SIB. In some embodiments, SI block 511 may contain scheduling information describing the CSIMs 512-1 to 512-N that are to be collectively used to convey the complete set of CSIBs 308. In various embodiments, such scheduling information may indicate a respective periodicity of transmission for each of CSIMs 512-1 to 512-N. In some embodiments, such scheduling information may indicate, for each one of CSIMs 512-1 to 512-N, a respective set of one or more types of CSIBs (from among the types of CSIBs included in CSIBs 308) that are to be contained in that CSIM. The embodiments are not limited in this context.

In various embodiments, based on information comprised in SI block 511, UE 104 may identify times at which CSIMs 512-1 to 512-N are to be transmitted, as well as the respective types of CSIB(s) to be comprised in each of CSIMs 512-1 to 512-N. In some embodiments, UE 104 may receive CSIMs 512-1 to 512-N and obtain therefrom a complete set of CSIBs 308, which it may store locally as stored CSIBs 514. The embodiments are not limited in this context.

It is worthy of note that in various embodiments, the scheduling information comprised in SI block 511 may—with respect to a given one of CSIMs 512-1 to 512-N—indicate one or more other types of SIBs that are to be contained in that CSIM along with one or more types of CSIBs. It is also worthy of note that in some embodiments, the scheduling information comprised in SI block 511 may describe—in addition to CSIMs 512-1 to 512-N—one or more other SI messages that do not comprise CSIBs 308 but do comprise other types of SIBs. The embodiments are not limited in this context.

Figure 6:
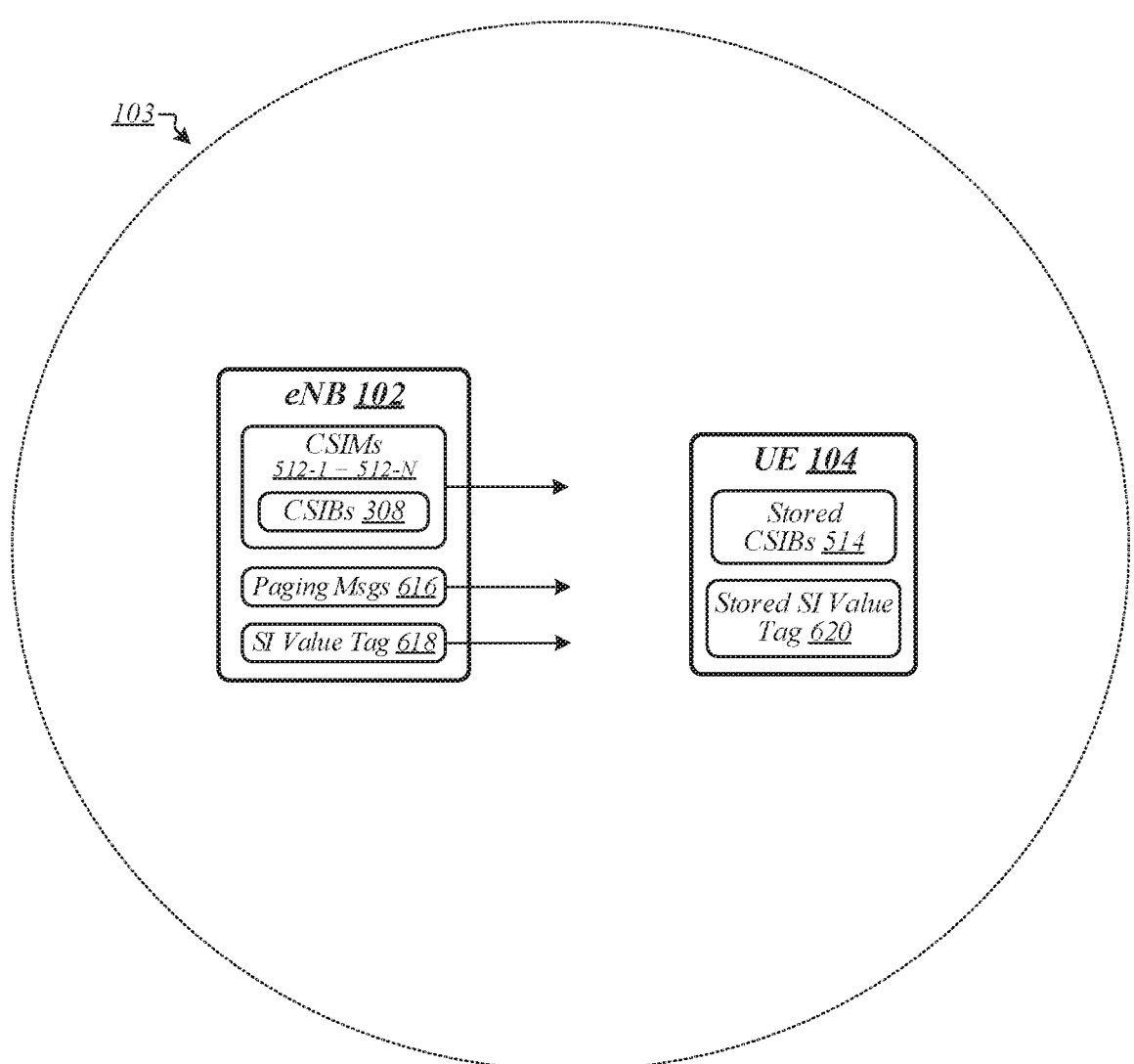
FIG. 6 illustrates an embodiment of a fourth operating environment.

FIG. 6 illustrates an example of an operating environment 600 that may be representative of various embodiments. In operating environment 600, at a time subsequent to that at which UE 104 acquires CSIBs 308 and stores them locally as stored CSIBs 514, eNB 102 may modify the contents of one or more of CSIBs 308. In order to notify devices in coverage of cell 103 that changes to one or more of CSIBs 308 have occurred, eNB 102 may transmit paging messages 616 that comprise indications that such changes have occurred. In response to receipt of such a paging message 616, UE 104 may determine that one or more of stored CSIBs 514 are no longer valid and need to be overwritten with updated versions of those CSIBs. It is worthy of note that in some embodiments, the use of paging messages 616 to provide change indications may not be specific to common SIBs such as CSIBs 308. In various embodiments, eNB 102 may use paging messages 616 to provide notifications of changes to one or more of CSIBs 308 or other SIBs 309. The embodiments are not limited in this context.

If UE 104 temporarily loses coverage of cell 103 and paging messages 616 are transmitted while UE 104 is out of coverage, then UE 104 may remain unaware of the CSIB changes at the time that it regains coverage. In some embodiments, eNB 102 may recurrently broadcast an SI value tag 618, the value of which it may increment or otherwise change in conjunction with modifying one or more of CSIBs 308. In various embodiments, upon regaining coverage of cell 103, UE 104 may identify a current value of SI value tag 618 and compare it with the value of a stored SI value tag 620 corresponding to the version of CSIBs 308 that is comprised in stored CSIBs 514. If SI value tag 618 matches stored SI value tag 620, UE 104 may conclude that stored CSIBs 514 are still valid. If SI value tag 618 does not match stored SI value tag 620, UE 104 may conclude that one or more of stored CSIBs 514 are no longer valid and need to be overwritten with updated versions of those CSIBs. In some embodiments, SI value tag 618 may comprise a systemInfoValueTag field of an SI block such as an SIB1. In various such embodiments, the value of SI value tag 618 may comprise an integer in the range 0 to 31, inclusive. The embodiments are not limited to this example.

Based on a determination that one or more of stored CSIBs 514 are obsolete, UE 104 may initiate a system information update procedure, according to which it may acquire and store current versions of those CSIBs. According to one possible approach, UE 104 may be configured to perform a system information update procedure that involves reacquiring and storing each of CSIBs 308. However, the implementation of such an approach may have the potential to impose significant power consumption burdens upon some devices that may operate in cell 103. For example, if UE 104 is operating in an enhanced coverage (EC) mode, it may need to receive and combine multiple respective copies of each of CSIMs 512-1 to 512-N in order to freshly acquire a complete set of CSIBs 308, a process which may consume a significant amount of power. If only one CSIB has actually changed, then a majority of this consumed power may essentially be wasted, as it may be expended in order to receive CSIMs comprising CSIBs that have not changed. As such, it may be desirable that eNB 102 be configured to provide devices in cell 103 with information that they can use to more particularly identify the CSIMs and/or CSIBs that they need to receive/acquire.

Figure 7:
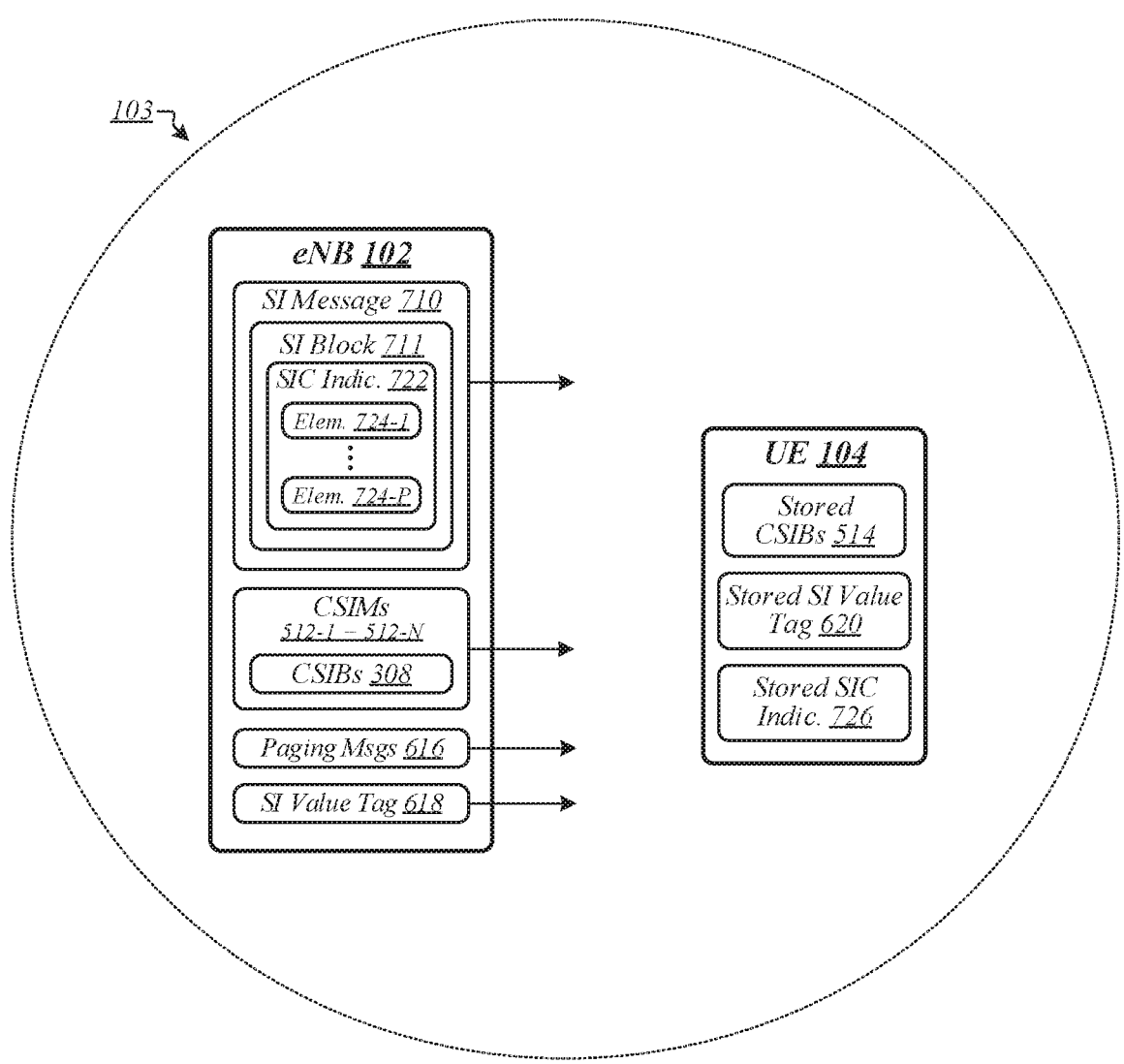
FIG. 7 illustrates an embodiment of a fifth operating environment.

FIG. 7 illustrates an example of an operating environment 700 that may be representative of the implementation of one or more novel system information change notification techniques according to some embodiments. In operating environment 700, eNB 102 may be configured to use a system information change (SIC) indication 722 in order to provide devices in cell 103 with details regarding SI changes such as may affect the contents of CSIBs 308. In various embodiments, based on SIC indication 722, UE 104 may be able to identify one or more CSIMs and/or one or more CSIBs that it does not need to reacquire in conjunction with updating its stored CSIBs 514 to reflect changes to CSIBs 308. In some embodiments, SIC indication 722 may be contained in an SI block 711 comprised in an SI message 710 that eNB 102 broadcasts in cell 103. In various embodiments, SI block 711 may comprise a type 1 SIB. In some other embodiments, SI block 711 may comprise an SIB of another type, such as another type of SIB depicted in FIG. 2 or an SIB of a newly-defined type. In various embodiments, SI block 711 may comprise a same type of SIB as one which comprises SI value tag 618. In some other embodiments, SI block 711 may comprise a different type of SIB as that which comprises SI value tag 618. Although SI value tag 618 is depicted as being external to SI block 711 and SI message 710 in FIG. 7, it is to be appreciated that in various embodiments, a same SI message 710 may comprise a same SI block 711 that contains both SIC indication 722 and SI value tag 618. The embodiments are not limited in this context.

In some embodiments, SIC indication 722 may comprise a plurality of elements 724-1 to 724-P. In various embodiments, elements 724-1 to 724-P may be SI message-specific, such that each one of elements 724-1 to 724-P generally comprises change information for a different respective one of a plurality of SI messages. In some embodiments, the number P of elements comprised in SIC indication 722 may be equal to the number N of CSIMs used to convey CSIBs 308, and each one of elements 724-1 to 724-P may comprise change information for a different respective one of CSIMs 512-1 to 512-N. In various other embodiments, the number P of elements comprised in SIC indication 722 may correspond to the total number of SI messages—potentially including SI messages not carrying common SIBs—for which scheduling information is comprised in SI block 711. In an example embodiment, SI block 711 may comprise a SchedulingInfoList field that comprises a plurality of SchedulingInfo fields, each of which may contain scheduling information that—for each of a plurality of SI messages— identifies a periodicity of transmission and one or more types of SIBs associated with that SI message. In such an example embodiment, the number P of elements comprised in SIC indication 722 may be equal to the number of SchedulingInfo fields comprised in SI block 711. The embodiments are not limited to this example.

In some embodiments, elements 724-1 to 724-P may be SIB-specific, such that each one of elements 724-1 to 724-P generally comprises change information for a different respective one of a plurality of SIBs. In various embodiments, the number P of elements comprised in SIC indication 722 may be equal to the number of different types of CSIBs 308 that are transmitted in cell 103, and each one of elements 724-1 to 724-P may comprise change information for a different respective one of those types of CSIBs 308. In some other embodiments, the number P of elements comprised in SIC indication 722 may correspond to the total number of SIBs—potentially including SIBs that are not common SIBs—for which scheduling information is comprised in SI block 711. The embodiments are not limited in this context.

In various embodiments, SIC indication 722 may comprise a bitmap, and each of elements 724-1 to 724-P may comprise a respective bit of that bitmap. In some other embodiments, SIC indication 722 may comprise a list of values, and each of elements 724-1 to 724-P may comprise a respective one of the values in that list. For example, in various embodiments, elements 724-1 to 724-P may comprise a list of Boolean values, a list of integer values, or a list of values of an enumerated type. In some embodiments, elements 724-1 to 724-P may comprise integer values within a same defined range as SI value tag 618. For example, in various embodiments, the value of SI value tag 618 may comprise an integer in the range 0 to 31, inclusive, and the values of elements 724-1 to 724-P may each comprise integers in the range 0 to 31, inclusive. In some other embodiments, a smaller range of permissible integer values may be defined for elements 724-1 to 724-P. In various embodiments, for example, the values of elements 724-1 to 724-P may each comprise integers in the range 0 to 3, inclusive. The embodiments are not limited to these examples.

In some embodiments, each of elements 724-1 to 724-P may represent an SIB-specific or SI message-specific value tag that is incremented, toggled, or otherwise changed each time the contents of a corresponding SIB or SI message are modified. In an example embodiment, elements 724-1 to 724-P may comprise two-bit values that are changed in conjunction with each modification of particular SIBs or SI messages to which they correspond. In various such embodiments, SIC indication 722 may be used in concert with SI value tag 618. In some embodiments, for example, after losing coverage for one or more modification periods, UE 104 may regain coverage and compare a current value of SI value tag 618 to the value of stored SI value tag 620. If the two match, UE 104 may determine that it has not missed any SI modifications. If the two do not match, UE 104 may identify the particular SIBs or SI messages for which it has missed modifications by comparing the various elements 724-1 to 724-P of SIC indication 722 with corresponding elements in a stored SIC indication 726 that corresponds to the versions of CSIBs 308 that are comprised in stored CSIBs 514.

It is worthy of note that in some cases, depending on the nature of elements 724-1 to 724-P, UE 104 may be forced to reacquire all of the associated SIBs even if some have not changed. For example, if elements 724-1 to 724-P comprise one-bit toggles and the difference between the current value of SI value tag 618 and the value of stored SI value tag 620 is greater than 1, a seemingly unchanged element may potentially signify either no changes to an associated SIB/SI message or multiple changes to the associated SIB/SI message. As UE 104 may have no way of determining which is the case, it may need to reacquire the associated SIB/SI message. The embodiments are not limited to this example.

In various embodiments, SIC indication 722 may generally be defined/understood to carry information that is reflective of SI change(s) occurring at one or more particular points in time. In some embodiments, SIC indication 722 may be defined/understood to carry information that is reflective of SI change(s) taking effect upon a next BCCH modification period boundary or boundary between periods of another defined type. In various such embodiments, an exception may be defined for certain types of SIBs. For example, in some such embodiments, elements associated with SIBs of types 10, 11, and 14 may be defined/understood to carry information that is reflective of immediate changes, while the remaining elements may be defined/understood to carry information that is reflective of changes taking effect upon a next BCCH modification period boundary or boundary between periods of another defined type. In various embodiments, SIC indication 722 may be defined/understood to carry information that is reflective of SI change(s) that took effect upon an immediately previous BCCH modification period boundary or boundary between periods of another defined type. In some embodiments, SIC indication 722 may be defined/understood to carry information that is reflective of SI change(s) that take effect immediately, or that will take effect during a current BCCH modification period or a current period of another defined type. The embodiments are not limited to these examples.

As previously discussed, one approach via which eNB 102 may notify devices in coverage of cell 103 of system information changes according to various embodiments may be by transmitting paging messages 616. In some embodiments, UE 104 may be configured to respond to receipt of a paging message 616 comprising an SI modification notification—such as a systemInfoModification field set to a value of 'true'—by checking SIC indication 722 to identify SIBs or SI messages that have changed. In various embodiments, if UE 104 is using an extended DRX (eDRX) cycle that is longer than the BCCH modification period or other type of modification period that governs the timings of changes to CSIBs 308, then the potential may exist for UE 104 to miss SI modification notifications provided using systemInfoModification fields in paging message 616. As such, in some embodiments, it may be desirable that another type of SI modification notification be defined that may be used to provide eDRX UEs with notifications of SI changes via paging. In various embodiments, such a new indication might depend on factors such as the H-SFN value or range and/or eDRX cycle length, for example. In some embodiments, this indication may comprise an integer value that is to be updated or increased within the H-SFN cycle or across different H-SFN boundaries. In various embodiments, the H-SFN cycle may comprise a duration that is equal to a positive integer multiple of 10.24 seconds. The embodiments are not limited in this context.

Figure 8:
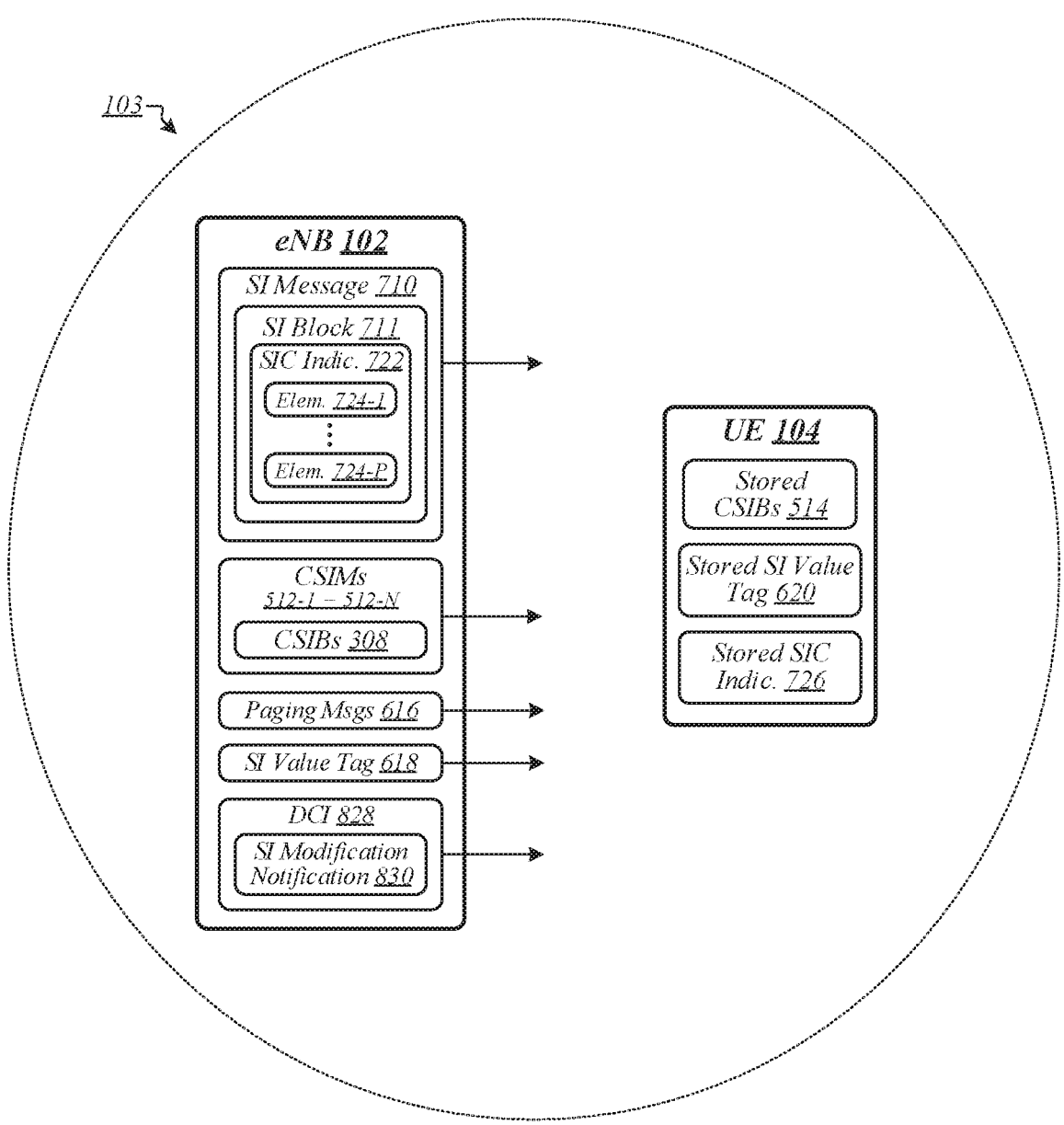
FIG. 8 illustrates an embodiment of a sixth operating environment.

In some embodiments, it may be desirable that eNB 102 be able to provide SI modification notifications to devices such as UE 104 in the form of downlink control information (DCI). FIG. 8 illustrates an example of an operating environment 800 that may be representative of various embodiments in which eNB 102 is configured to do so. In operating environment 800, eNB 102 may be operative to transmit DCI 828 over a DL control channel such as a machine-type communication (MTC) physical downlink control channel (M-PDCCH) in order to provide UE 104 with an SI modification notification 830. In some embodiments, SI modification notification 830 may comprise a general indication of a change in SI, which may or may not involve changes in one or more CSIBs, and UE 104 may read an SI block such as SI block 711 in order to determine the particular nature of the changes. For example, in various embodiments, the presence of SI modification notification 830 may be representative of any or all of a systemInfoModification notification (corresponding to changes to one or more CSIBs), an ETWS indication, a CMAS indication, and an EAB parameter modification notification. In another example, SI modification notification 830 may be provided either as an indication of one or more CSIB changes or as a representation of one or more of an ETWS indication, a CMAS indication, and an EAB parameter modification notification. In some other embodiments, SI modification notification 830 may be usable to provide multiple independent notifications, including a notification of CSIB changes and notifications of one or more other types. For example, in various embodiments, SI modification notification 830 may comprise four bits. One such bit may be usable to provide a notification of CSIB changes, another such bit may be usable to provide an ETWS indication, a third such bit may be usable to provide a CMAS indication, and the remaining such bit may be usable to provide an EAB parameter modification notification. The embodiments are not limited to this example.

In some embodiments, eNB 102 may use SI modification notification 830 to provide such notifications in lieu of providing them in paging messages 616. In various embodiments, eNB 102 may be configured to use a same DCI format for DCI 828 as it does for DCI that is used to schedule physical downlink shared channel (PDSCH) resources to carry paging messages 616. In some embodiments, UE 104 may be configured to monitor for that DCI format during paging occasions (POs)/paging frames (PFs), and a field corresponding to SI modification notification 830 may be defined to always be present in DCI of that format, even when the DCI is being used for traffic-related paging message scheduling. In various other embodiments, a different DCI format may be defined for carrying SI modification notification 830. In some embodiments, this DCI format may be of a same size as the DCI format used for scheduling PDSCH resources to carry traffic-related paging messages. In various such embodiments, these two like-sized DCI formats may be distinguished via different RNTIs that are used to scramble their associated CRCs. For example, in some embodiments, a paging RNTI (P-RNTI) may be used to scramble CRCs for DCI carrying PDSCH assignments for traffic-related paging, while a system information update RNTI (SIU-RNTI) may be defined for use to scramble CRCs for DCI carrying SI modification notifications. In various embodiments, rather than being defined to be of a same size as the traffic-related paging DCI format, the DCI format for carrying SI modification notifications may be defined to be of a different size that more closely matches the amount of information to be conveyed. In some embodiments, the implementation of such differing DCI sizes in this context may necessitate two blind decoding attempts on the part of UE 104. In various embodiments, the need for multiple blind decoding attempts may be avoided by defining/specifying different POs/PFs to be used for conveying SI modification notifications than those that are used for traffic-related paging. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 9A:
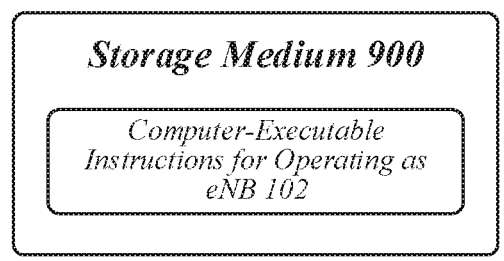
FIG. 9A illustrates an embodiment of a first storage medium.

FIG. 9A illustrates an embodiment of a storage medium 900. Storage medium 900 may comprise any computer-readable storage medium or machine-readable storage medium, such as an optical, magnetic or semiconductor storage medium. In some embodiments, storage medium 900 may comprise a non-transitory storage medium. In various embodiments, storage medium 900 may comprise an article of manufacture. In some embodiments, storage medium 900 may store computer-executable instructions, such as computer-executable instructions to implement operations described for eNB 102 in one or more of operating environments 100, 300, 500, 600, 700, and 800. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9B:
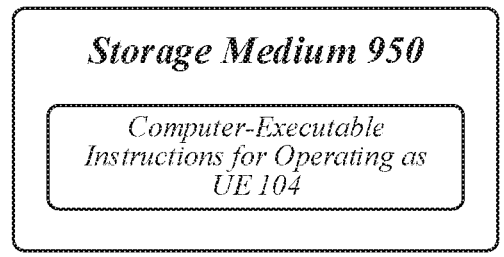
FIG. 9B illustrates an embodiment of a second storage medium.

FIG. 9B illustrates an embodiment of a storage medium 950. Storage medium 950 may comprise any computer-readable storage medium or machine-readable storage medium, such as an optical, magnetic or semiconductor storage medium. In some embodiments, storage medium 950 may comprise a non-transitory storage medium. In various embodiments, storage medium 950 may comprise an article of manufacture. In some embodiments, storage medium 950 may store computer-executable instructions, such as computer-executable instructions to implement operations described for UE 104 in one or more of operating environments 100, 300, 500, 600, 700, and 800. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

FIG. 10 illustrates an example of a UE device 1000 that may be representative of a UE that implements one or more of the disclosed techniques in various embodiments. In some embodiments, the UE device 1000 may include application circuitry 1002, baseband circuitry 1004, Radio Frequency (RF) circuitry 1006, front-end module (FEM) circuitry 1008 and one or more antennas 1010, coupled together at least as shown.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004*a*, third generation (3G) baseband processor 1004*b*, fourth generation (4G) baseband processor 1004*c*, and/or other baseband processor(s) 1004*d* for other existing generations, generations in development or to be developed in the future (e.g., fifth generation (5G), 6G, etc.). The baseband circuitry 1004 (e.g., one or more of baseband processors 1004*a*-*d*) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004*e* of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 1004*f*. The audio DSP(s) 1004*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006*a*, amplifier circuitry 1006*b* and filter circuitry 1006*c*. The transmit signal path of the RF circuitry 1006 may include filter circuitry 1006*c* and mixer circuitry 1006*a*. RF circuitry 1006 may also include synthesizer circuitry 1006*d* for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010.

In some embodiments, the UE device 1000 may include additional elements such as, for example, memory/storage, display, camera, sensor, and/or input/output (I/O) interface.

Figure 11:
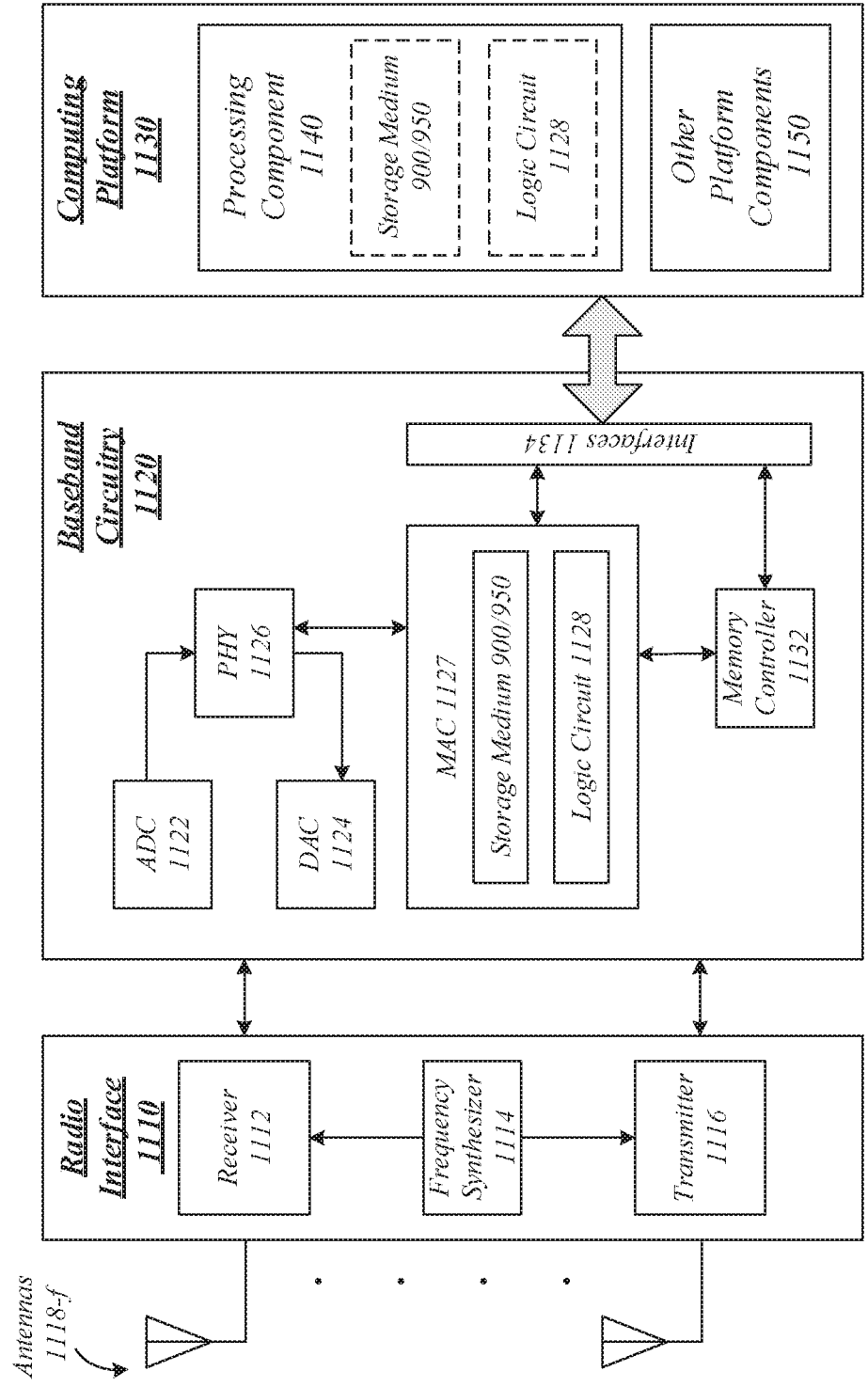
FIG. 11 illustrates an embodiment of a communication device.

FIG. 11 illustrates an embodiment of a communications device 1100 that may implement one or more of eNB 102, UE 104, storage medium 900, storage medium 950, and UE 1000. In various embodiments, device 1100 may comprise a logic circuit 1128. The logic circuit 1128 may include physical circuits to perform operations described for one or more of eNB 102, UE 104, and UE 100, for example. As shown in FIG. 11, device 1100 may include a radio interface 1110, baseband circuitry 1120, and computing platform 1130, although the embodiments are not limited to this configuration.

The device 1100 may implement some or all of the structure and/or operations for one or more of eNB 102, UE 104, storage medium 900, storage medium 950, UE 1000, and logic circuit 1128 in a single computing entity, such as entirely within a single device. Alternatively, the device 1100 may distribute portions of the structure and/or operations for one or more of eNB 102, UE 104, storage medium 900, storage medium 950, UE 1000, and logic circuit 1128 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1110 may include, for example, a receiver 1112, a frequency synthesizer 1114, and/or a transmitter 1116. Radio interface 1110 may include bias controls, a crystal oscillator and/or one or more antennas 1118-$f$. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, a mixer for down-converting received RF signals, an analog-to-digital converter 1122 for converting analog signals to digital form, a digital-to-analog converter 1124 for converting digital signals to analog form, and a mixer for up-converting signals for transmission. Further, baseband circuitry 1120 may include a baseband or physical layer (PHY) processing circuit 1126 for PHY link layer processing of respective receive/transmit signals. Baseband circuitry 1120 may include, for example, a medium access control (MAC) processing circuit 1127 for MAC/data link layer processing. Baseband circuitry 1120 may include a memory controller 1132 for communicating with MAC processing circuit 1127 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames. Alternatively or in addition, MAC processing circuit 1127 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for one or more of eNB 102, UE 104, storage medium 900, storage medium 950, UE 1000, and logic circuit 1128 using the processing component 1140. The processing component 1140 (and/or PHY 1126 and/or MAC 1127) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired.

Embodiments of device 1100 may be implemented using single input single output (SISO) architectures. However, certain implementations may include multiple antennas (e.g., antennas 1118-f) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 12:
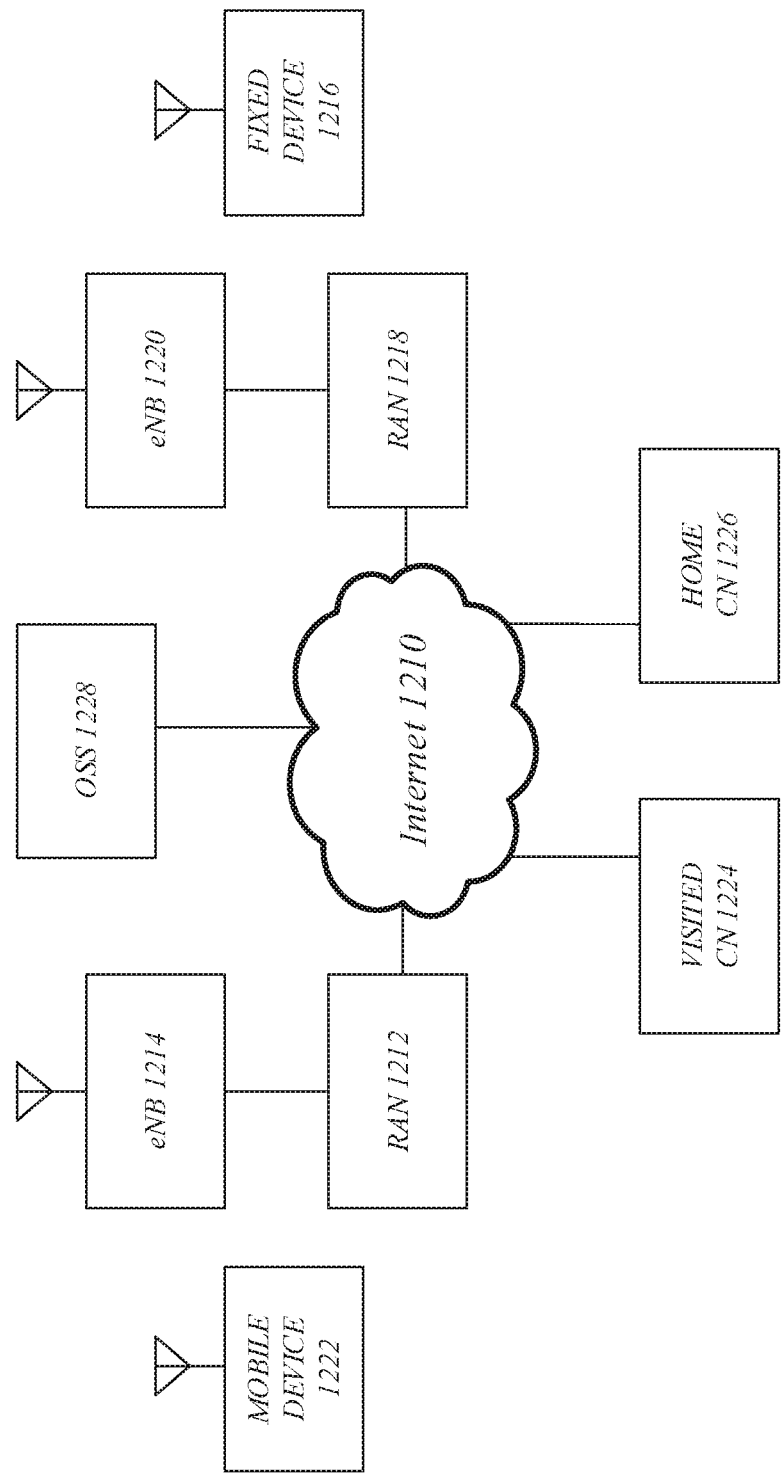
FIG. 12 illustrates an embodiment of a wireless network.

FIG. 12 illustrates an embodiment of a broadband wireless access system 1200. As shown in FIG. 12, broadband wireless access system 1200 may be an internet protocol (IP) type network comprising an internet 1210 type network or the like that is capable of supporting mobile wireless access and/or fixed wireless access to internet 1210. In one or more embodiments, broadband wireless access system 1200 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1200, radio access networks (RANs) 1212 and 1218 are capable of coupling with evolved node Bs (eNBs) 1214 and 1220, respectively, to provide wireless communication between one or more fixed devices 1216 and internet 1210 and/or between or one or more mobile devices 1222 and Internet 1210. One example of a fixed device 1216 and a mobile device 1222 is device 1100 of FIG. 11, with the fixed device 1216 comprising a stationary version of device 1100 and the mobile device 1222 comprising a mobile version of device 1100. RANs 1212 and 1218 may implement profiles that are capable of defining the mapping of network functions to one or more physical entities on broadband wireless access system 1200. eNBs 1214 and 1220 may comprise radio equipment to provide RF communication with fixed device 1216 and/or mobile device 1222, such as described with reference to device 1100, and may comprise, for example, the PHY and MAC layer equipment in compliance with a 3GPP LTE Specification or an IEEE 802.16 Standard. eNBs 1214 and 1220 may further comprise an IP backplane to couple to Internet 1210 via RANs 1212 and 1218, respectively, although the scope of the claimed subject matter is not limited in these respects.

Broadband wireless access system 1200 may further comprise a visited core network (CN) 1224 and/or a home CN 1226, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1224 and/or home CN 1226, and the scope of the claimed subject matter is not limited in these respects. Visited CN 1224 may be referred to as a visited CN in the case where visited CN 1224 is not part of the regular service provider of fixed device 1216 or mobile device 1222, for example where fixed device 1216 or mobile device 1222 is roaming away from its respective home CN 1226, or where broadband wireless access system 1200 is part of the regular service provider of fixed device 1216 or mobile device 1222 but where broadband wireless access system 1200 may be in another location or state that is not the main or home location of fixed device 1216 or mobile device 1222. The embodiments are not limited in this context.

Fixed device 1216 may be located anywhere within range of one or both of eNBs 1214 and 1220, such as in or near a home or business to provide home or business customer broadband access to Internet 1210 via eNBs 1214 and 1220 and RANs 1212 and 1218, respectively, and home CN 1226. It is worthy of note that although fixed device 1216 is generally disposed in a stationary location, it may be moved to different locations as needed. Mobile device 1222 may be utilized at one or more locations if mobile device 1222 is within range of one or both of eNBs 1214 and 1220, for example. In accordance with one or more embodiments, operation support system (OSS) 1228 may be part of broadband wireless access system 1200 to provide management functions for broadband wireless access system 1200 and to provide interfaces between functional entities of broadband wireless access system 1200. Broadband wireless access system 1200 of FIG. 12 is merely one type of wireless network showing a certain number of the components of broadband wireless access system 1200, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following Examples pertain to further embodiments:

Example 1 is an apparatus, comprising a memory, and logic, at least a portion of which is implemented in circuitry coupled to the memory, the logic to determine to perform a system information (SI) update procedure at user equipment (UE), identify, based on an SI change indication, one or more SI messages from which to acquire system information blocks (SIBs) according to the SI update procedure, and acquire at least one SIB from each of the one or more SI messages for storage at the UE.

Example 2 is the apparatus of Example 1, the SI change indication to be comprised in a received type 1 SIB (SIB1).

Example 3 is the apparatus of Example 2, the logic to determine to perform the SI update procedure based on a determination that an SI value tag comprised in the received SIB1 does not match a stored SI value tag.

Example 4 is the apparatus of any of Examples 1 to 3, the logic to determine to perform the SI update procedure based on a determination that a validity period for one or more stored SIBs has expired.

Example 5 is the apparatus of any of Examples 1 to 3, the logic to determine to perform the SI update procedure in response to an SI modification notification received from an evolved node B (eNB).

Example 6 is the apparatus of Example 5, the SI modification notification to be comprised in a received paging message.

Example 7 is the apparatus of Example 6, the SI modification notification to be comprised in a systemInfoModification field of the received paging message.

Example 8 is the apparatus of Example 5, the SI modification notification to comprise downlink control information (DCI) received over a machine-type communications (MTC) physical downlink control channel (M-PDCCH).

Example 9 is the apparatus of any of Examples 1 to 8, the SI change indication to comprise an SI message-specific indication including a respective element for each one of a plurality of SI messages.

Example 10 is the apparatus of Example 9, the logic to acquire each SIB comprised in each of the one or more SI messages.

Example 11 is the apparatus of any of Examples 1 to 8, the SI change indication to comprise an SIB-specific indication including a respective element for each one of a plurality of SIBs.

Example 12 is the apparatus of any of Examples 1 to 11, the logic to use each SIB acquired from the one or more SI messages to overwrite a respective one of a plurality of stored SIBs.

Example 13 is the apparatus of any of Examples 1 to 12, the UE to comprise a cellular Internet of Things (CIoT) UE, a narrowband Internet of Things (NB-IoT) UE, or a machine-type communications (MTC) UE.

Example 14 is the apparatus of any of Examples 1 to 13, the UE to comprise a low-complexity (LC) UE, a category M (Cat-M) UE, a category 0 (Cat-0) UE, or a category NB (Cat-NB) UE.

Example 15 is the apparatus of any of Examples 1 to 14, the UE to operate using a reduced bandwidth or narrowband.

Example 16 is the apparatus of any of Examples 1 to 15, the UE to operate in an enhanced coverage (EC) mode.

Example 17 is a system, comprising an apparatus according to any of Examples 1 to 16, at least one radio frequency transceiver, and at least one RF antenna.

Example 18 is at least one computer-readable medium comprising a set of instructions that, in response to being executed at user equipment (UE), cause the UE to determine to perform a system information (SI) update procedure, identify, based on an SI change indication, one or more SI messages from which to acquire system information blocks (SIBs) according to the SI update procedure, and acquire at least one SIB from each of the one or more SI messages for storage at the UE.

Example 19 is the at least one computer-readable storage medium of Example 18, the SI change indication to be comprised in a received type 1 SIB (SIB1).

Example 20 is the at least one computer-readable storage medium of Example 19, comprising instructions that, in response to being executed at the UE, cause the UE to determine to perform the SI update procedure based on a determination that an SI value tag comprised in the received SIB1 does not match a stored SI value tag.

Example 21 is the at least one computer-readable storage medium of any of Examples 18 to 20, comprising instructions that, in response to being executed at the UE, cause the UE to determine to perform the SI update procedure based on a determination that a validity period for one or more stored SIBs has expired.

Example 22 is the at least one computer-readable storage medium of any of Examples 18 to 20, comprising instructions that, in response to being executed at the UE, cause the UE to determine to perform the SI update procedure in response to an SI modification notification received from an evolved node B (eNB).

Example 23 is the at least one computer-readable storage medium of Example 22, the SI modification notification to be comprised in a received paging message.

Example 24 is the at least one computer-readable storage medium of Example 23, the SI modification notification to be comprised in a systemInfoModification field of the received paging message.

Example 25 is the at least one computer-readable storage medium of Example 22, the SI modification notification to comprise downlink control information (DCI) received over a machine-type communications (MTC) physical downlink control channel (M-PDCCH).

Example 26 is the at least one computer-readable storage medium of any of Examples 18 to 25, the SI change indication to comprise an SI message-specific indication including a respective element for each one of a plurality of SI messages.

Example 27 is the at least one computer-readable storage medium of Example 26, comprising instructions that, in response to being executed at the UE, cause the UE to acquire each SIB comprised in each of the one or more SI messages.

Example 28 is the at least one computer-readable storage medium of any of Examples 18 to 25, the SI change indication to comprise an SIB-specific indication including a respective element for each one of a plurality of SIBs.

Example 29 is the at least one computer-readable storage medium of any of Examples 18 to 28, comprising instructions that, in response to being executed at the UE, cause the UE to use each SIB acquired from the one or more SI messages to overwrite a respective one of a plurality of stored SIBs.

Example 30 is the at least one computer-readable storage medium of any of Examples 18 to 29, the UE to comprise a cellular Internet of Things (CIoT) UE, a narrowband Internet of Things (NB-IoT) UE, or a machine-type communications (MTC) UE.

Example 31 is the at least one computer-readable storage medium of any of Examples 18 to 30, the UE to comprise a low-complexity (LC) UE, a category M (Cat-M) UE, a category 0 (Cat-0) UE, or a category NB (Cat-NB) UE.

Example 32 is the at least one computer-readable storage medium of any of Examples 18 to 31, the UE to operate using a reduced bandwidth or narrowband.

Example 33 is the at least one computer-readable storage medium of any of Examples 18 to 32, the UE to operate in an enhanced coverage (EC) mode.

Example 34 is a method, comprising determining, at user equipment (UE), to perform a system information (SI) update procedure, identifying, based on an SI change indication, one or more SI messages from which to acquire system information blocks (SIBs) according to the SI update procedure, and acquiring at least one SIB from each of the one or more SI messages for storage at the UE.

Example 35 is the method of Example 34, the SI change indication to be comprised in a received type 1 SIB (SIB1).

Example 36 is the method of Example 35, comprising determining to perform the SI update procedure based on a determination that an SI value tag comprised in the received SIB1 does not match a stored SI value tag.

Example 37 is the method of any of Examples 34 to 36, comprising determining to perform the SI update procedure based on a determination that a validity period for one or more stored SIBs has expired.

Example 38 is the method of any of Examples 34 to 36, comprising determining to perform the SI update procedure in response to an SI modification notification received from an evolved node B (eNB).

Example 39 is the method of Example 38, the SI modification notification to be comprised in a received paging message.

Example 40 is the method of Example 39, the SI modification notification to be comprised in a systemInfoModification field of the received paging message.

Example 41 is the method of Example 38, the SI modification notification to comprise downlink control information (DCI) received over a machine-type communications (MTC) physical downlink control channel (M-PDCCH).

Example 42 is the method of any of Examples 34 to 41, the SI change indication to comprise an SI message-specific indication including a respective element for each one of a plurality of SI messages.

Example 43 is the method of Example 42, comprising acquiring each SIB comprised in each of the one or more SI messages.

Example 44 is the method of any of Examples 34 to 41, the SI change indication to comprise an SIB-specific indication including a respective element for each one of a plurality of SIBs.

Example 45 is the method of any of Examples 34 to 44, comprising using each SIB acquired from the one or more SI messages to overwrite a respective one of a plurality of stored SIBs.

Example 46 is the method of any of Examples 34 to 45, the UE to comprise a cellular Internet of Things (CIoT) UE, a narrowband Internet of Things (NB-IoT) UE, or a machine-type communications (MTC) UE.

Example 47 is the method of any of Examples 34 to 46, the UE to comprise a low-complexity (LC) UE, a category M (Cat-M) UE, a category 0 (Cat-0) UE, or a category NB (Cat-NB) UE.

Example 48 is the method of any of Examples 34 to 47, the UE to operate using a reduced bandwidth or narrowband.

Example 49 is the method of any of Examples 34 to 48, the UE to operate in an enhanced coverage (EC) mode.

Example 50 is at least one computer-readable storage medium comprising a set of instructions that, in response to being executed on a computing device, cause the computing device to perform a method according to any of Examples 34 to 49.

Example 51 is an apparatus, comprising means for performing a method according to any of Examples 34 to 49.

Example 52 is a system, comprising the apparatus of Example 51, at least one radio frequency (RF) transceiver, and at least one RF antenna.

Example 53 is an apparatus, comprising means for determining to perform a system information (SI) update procedure at user equipment (UE), means for identifying, based on an SI change indication, one or more SI messages from which to acquire system information blocks (SIBs) according to the SI update procedure, and means for acquiring at least one SIB from each of the one or more SI messages for storage at the UE.

Example 54 is the apparatus of Example 53, the SI change indication to be comprised in a received type 1 SIB (SIB1).

Example 55 is the apparatus of Example 54, comprising means for determining to perform the SI update procedure based on a determination that an SI value tag comprised in the received SIB1 does not match a stored SI value tag.

Example 56 is the apparatus of any of Examples 53 to 55, comprising means for determining to perform the SI update procedure based on a determination that a validity period for one or more stored SIBs has expired.

Example 57 is the apparatus of any of Examples 53 to 55, comprising means for determining to perform the SI update procedure in response to an SI modification notification received from an evolved node B (eNB).

Example 58 is the apparatus of Example 57, the SI modification notification to be comprised in a received paging message.

Example 59 is the apparatus of Example 58, the SI modification notification to be comprised in a systemInfoModification field of the received paging message.

Example 60 is the apparatus of Example 57, the SI modification notification to comprise downlink control information (DCI) received over a machine-type communications (MTC) physical downlink control channel (M-PDCCH)

Example 61 is the apparatus of any of Examples 53 to 60, the SI change indication to comprise an SI message-specific indication including a respective element for each one of a plurality of SI messages.

Example 62 is the apparatus of Example 61, comprising means for acquiring each SIB comprised in each of the one or more SI messages.

Example 63 is the apparatus of any of Examples 53 to 60, the SI change indication to comprise an SIB-specific indication including a respective element for each one of a plurality of SIBs.

Example 64 is the apparatus of any of Examples 53 to 63, means for comprising using each SIB acquired from the one or more SI messages to overwrite a respective one of a plurality of stored SIBs.

Example 65 is the apparatus of any of Examples 53 to 64, the UE to comprise a cellular Internet of Things (CIoT) UE, a narrowband Internet of Things (NB-IoT) UE, or a machine-type communications (MTC) UE.

Example 66 is the apparatus of any of Examples 53 to 65, the UE to comprise a low-complexity (LC) UE, a category M (Cat-M) UE, a category 0 (Cat-0) UE, or a category NB (Cat-NB) UE.

Example 67 is the apparatus of any of Examples 53 to 66, the UE to operate using a reduced bandwidth or narrowband.

Example 68 is the apparatus of any of Examples 53 to 67, the UE to operate in an enhanced coverage (EC) mode.

Example 69 is a system, comprising an apparatus according to any of Examples 53 to 68, at least one radio frequency (RF) transceiver, and at least one RF antenna.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a memory; and
logic for user equipment (UE), at least a portion of the logic implemented in circuitry coupled to the memory, the logic to:
  determine that a stored set of system information (SI) associated with a radio access network (RAN) cell served by an evolved node B (eNB) includes invalid system information;
  identify an SI message based on an SI message-specific value tag comprised in a radio resource control (RRC) message received from the eNB, the SI message associated with one or more invalid SI blocks (SIBs) comprised in the stored set of SI;
  acquire one or more SIBs from the SI message, the one or more acquired SIBs to comprise valid versions of the one or more invalid SIBs; and
  overwrite the one or more invalid SIBs with the one or more acquired SIBs,
  wherein the RRC message is distinct from the one or more acquired SIBs.

2. The apparatus of claim 1, the logic to determine that the stored set of system information includes invalid system information based on a determination that a current system information value tag (systemInfoValueTag) for the cell differs from a stored systemInfoValueTag associated with the cell.

3. The apparatus of claim 2, the RRC message to contain a field comprising the current systemInfoValueTag for the cell.

4. The apparatus of claim 2, the logic to identify the current systemInfoValueTag for the cell based on a field comprised in a second RRC message received from the eNB.

5. The apparatus of claim 1, the logic to determine that the stored set of system information includes invalid system information based on a notification received from the eNB.

6. The apparatus of claim 5, the notification to be comprised in a paging message received from the eNB.

7. The apparatus of claim 6, the paging message to contain a systemInfoModification field comprising the notification.

8. The apparatus of claim 5, the notification to be comprised in downlink control information (DCI) received from the eNB.

9. The apparatus of claim 1, the logic to identify the SI message during operation of the UE as a Narrowband Internet of Things (NB-IoT) UE.

10. The apparatus of claim 1, the logic to identify the SI message during operation of the UE using a reduced bandwidth.

11. The apparatus of claim 10, the UE to comprise a low complexity UE.

12. The apparatus of claim 1, the logic to identify the SI message during operation of the UE in an enhanced coverage mode.

13. A non-transitory computer-readable storage medium comprising a set of instructions that, in response to being executed at user equipment (UE), cause the UE to:
  determine that a stored set of system information (SI) associated with a radio access network (RAN) cell served by an evolved node B (eNB) includes invalid system information;
  identify an SI message based on an SI message-specific value tag comprised in a radio resource control (RRC) message received from the eNB, the SI message associated with one or more invalid SI blocks (SIBs) comprised in the stored set of SI;
  acquire one or more SIBs from the SI message, the one or more acquired SIBs to comprise valid versions of the one or more invalid SIBs; and
  overwrite the one or more invalid SIBs with the one or more acquired SIBs,
  wherein the RRC message is distinct from the one or more acquired SIBs.

14. The computer-readable storage medium of claim 13, the set of instructions to cause the UE to determine that the stored set of system information includes invalid system information based on a determination that a current system information value tag (systemInfoValueTag) for the cell differs from a stored systemInfoValueTag associated with the cell.

15. The computer-readable storage medium of claim 14, the RRC message to contain a field comprising the current systemInfoValueTag for the cell.

16. The computer-readable storage medium of claim 14, the set of instructions to cause the UE to identify the current systemInfoValueTag for the cell based on a field comprised in a second RRC message received from the eNB.

17. The computer-readable storage medium of claim 13, the set of instructions to cause the UE to determine that the stored set of system information includes invalid system information based on a notification received from the eNB.

18. The computer-readable storage medium of claim 17, the notification to be comprised in a paging message received from the eNB.

19. The computer-readable storage medium of claim 18, the paging message to contain a systemInfoModification field comprising the notification.

20. The computer-readable storage medium of claim 17, the notification to be comprised in downlink control information (DCI) received from the eNB.

21. The computer-readable storage medium of claim 13, the set of instructions to cause the UE to identify the SI message during operation of the UE as a Narrowband Internet of Things (NB-IoT) UE.

22. The computer-readable storage medium of claim 13, the set of instructions to cause the UE to identify the SI message during operation of the UE using a reduced bandwidth.

23. The computer-readable storage medium of claim 13, the set of instructions to cause the UE to identify the SI message during operation of the UE in an enhanced coverage mode.

24. A method, comprising:
  determining that a stored set of system information (SI) associated with a radio access network (RAN) cell served by an evolved node B (eNB) includes invalid system information;
  identifying an SI message based on an SI message-specific value tag comprised in a radio resource control (RRC) message received from the eNB, the SI message associated with one or more invalid SI blocks (SIBs) comprised in the stored set of SI;
  acquiring one or more SIBs from the SI message, the one or more acquired SIBs to comprise valid versions of the one or more invalid SIBs; and
  overwriting the one or more invalid SIBs with the one or more acquired SIBs, wherein the RRC message is distinct from the one or more acquired SIBs.

25. The method of claim 24, comprising determining that the stored set of system information includes invalid system information based on a determination that a current system information value tag (systemInfoValueTag) for the cell differs from a stored systemInfoValueTag associated with the cell.

26. The method of claim 25, the RRC message to contain a field comprising the current systemInfoValueTag for the cell.

27. The method of claim 25, comprising identifying the current systemInfoValueTag for the cell based on a field comprised in a second RRC message received from the eNB.

28. The method of claim 24, comprising determining that the stored set of system information includes invalid system information based on a notification received from the eNB.

29. The method of claim 28, the notification to be comprised in a paging message received from the eNB.

30. The method of claim 29, the paging message to contain a systemInfoModification field comprising the notification.

31. The method of claim 28, the notification to be comprised in downlink control information (DCI) received from the eNB.

32. The method of claim 24, comprising identifying the SI message during operation of the UE as a Narrowband Internet of Things (NB-IoT) UE.

33. The method of claim 24, comprising identifying the SI message during operation of the UE using a reduced bandwidth.

34. The method of claim 24, comprising identifying the SI message during operation of the UE in an enhanced coverage mode.

* * * * *